Figure 1:
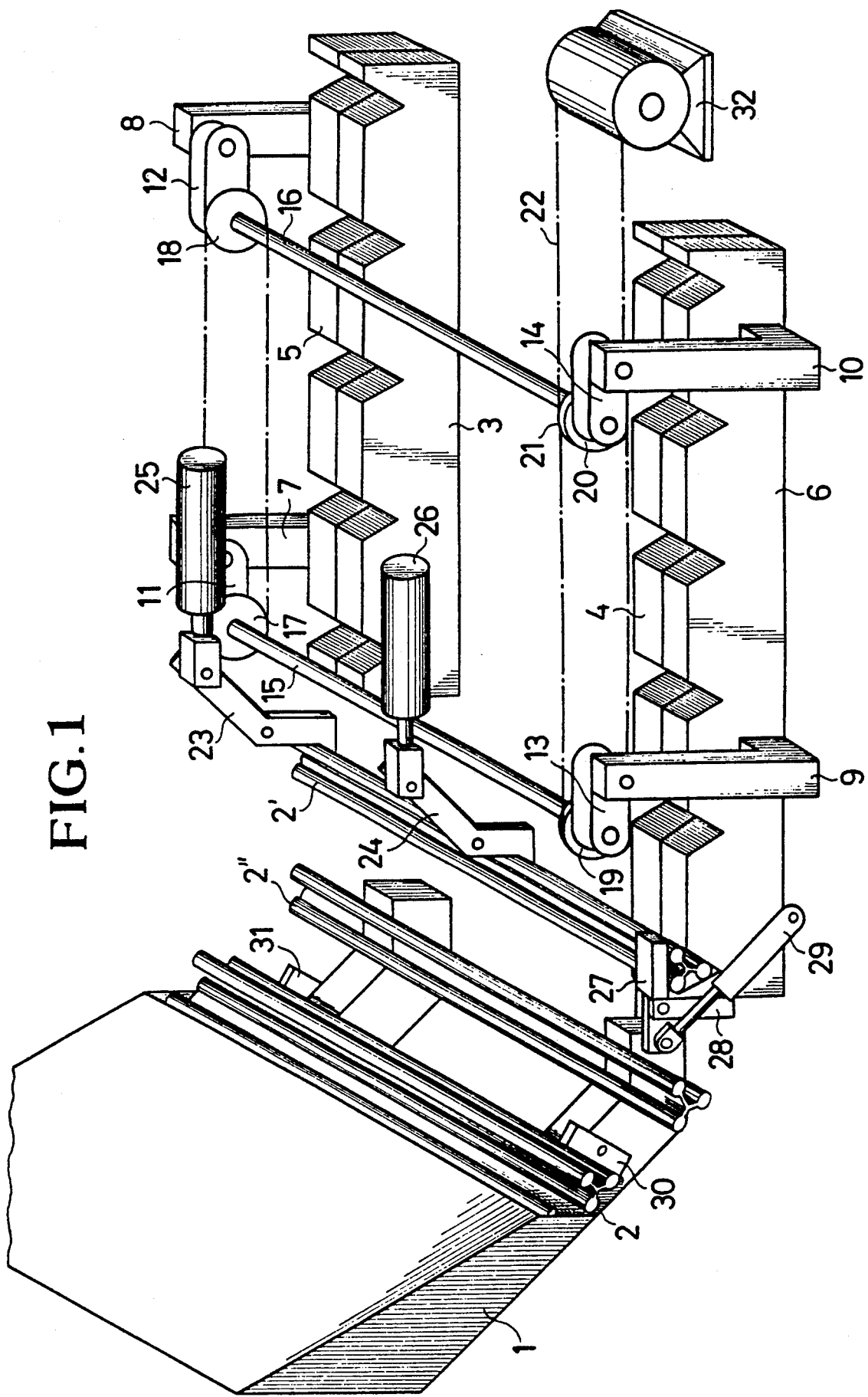

United States Patent [19]

Kollross et al.

[11] Patent Number: 5,082,419
[45] Date of Patent: Jan. 21, 1992

[54] PROCESS FOR THE INPUT AND CARRYING AWAY OF SMOKING OR COOKING RODS FOR AUTOMATIC SUSPENSION OF A PLURALITY OF SAUSAGES

[75] Inventors: Günter Kollross, Gross Gerau-Dornheim; Fritz K. Steinbis, Gross Gerau, both of Fed. Rep. of Germany

[73] Assignee: Gunter Kollross, Fed. Rep. of Germany

[21] Appl. No.: 583,552

[22] Filed: Sep. 17, 1990

[30] Foreign Application Priority Data

Sep. 15, 1989 [DE] Fed. Rep. of Germany ....... 3930876

[51] Int. Cl.⁵ .............................................. B65G 25/02
[52] U.S. Cl. ................................. 414/786; 414/745.7; 99/443 C; 99/482; 452/51; 452/186; 198/774.1
[58] Field of Search .................. 198/774.1; 414/745.1, 414/745.7, 745.9, 746.1, 786; 452/51, 183, 186; 99/443 C, 482

[56] References Cited

U.S. PATENT DOCUMENTS

| 1,922,263 | 8/1933 | Schmidt | 452/186 |
| 4,050,571 | 9/1977 | Kushigian | 198/774.1 |
| 4,401,018 | 8/1983 | Berry | 99/443 C |
| 4,494,276 | 1/1985 | Trottmann | 452/51 |
| 4,547,931 | 10/1985 | Staudenrausch et al. | 452/51 |
| 4,644,607 | 2/1987 | Sziede | 452/186 X |
| 4,660,712 | 4/1987 | Braidotti et al. | 414/745.7 X |
| 4,961,373 | 10/1990 | Milone | 99/443 C |

FOREIGN PATENT DOCUMENTS

| 3322759 | 11/1984 | Fed. Rep. of Germany . |
| 3437830 | 8/1986 | Fed. Rep. of Germany . |
| 3808518 | 9/1989 | Fed. Rep. of Germany ... 198/774.1 |

Primary Examiner—Robert J. Spar
Assistant Examiner—Craig Slavin
Attorney, Agent, or Firm—Larson and Taylor

[57] ABSTRACT

A process for the input and carrying away of smoking rods or cooking rods to and from a station for the automatic suspension of sausages provided with loops on a rod which in turn is tightly chucked at one end works as follows: the rods are first brought out of a storage area one after the other into horizontal arrangement in a readiness position. Then one rod is tightly chucked there and is fed by a horizontal movement to the loading station; finally the loaded rod is picked up at both ends and fed in the same direction as before to a holding station, in which a number of loaded rods are collected for transfer by being shoved onto a smoking or cooking wagon. The process is carried out nearly without dead time, and is accomplished by an operator who remains for the post part independent of the filling and suspending cycle.

7 Claims, 11 Drawing Sheets

PROCESS FOR THE INPUT AND CARRYING AWAY OF SMOKING OR COOKING RODS FOR AUTOMATIC SUSPENSION OF A PLURALITY OF SAUSAGES

DESCRIPTION

The invention relates to a process for the input and carrying away of smoking or cooking rods to and from a loading station, at which one rod at a time is tightly chucked at one end for the automatic suspension of a number of sausages on loops connected thereto and is supported alternately at at least two points at some distance from one another on the rod, as well as a device for execution of this process.

From German Offenlegungsschrift 33 22 759 it is known to pick up individual sausages produced by fully automated production on loops during the fastening to the ends of the sausages with a guide element and to feed them in this manner to a smoking rod or cooking rod held securely at one end.

From German Patent 34 37 830 it is further known to manually insert the smoking or cooking rods to be loaded with the sausages produced in this manner individually into a suspension device which is rotatable around its longitudinal axis and to draw the rods out again following the resulting loading for manual transfer to the smoking or cooking wagon. Two persons are required for operation of this device. Because of this there is considerable dead time during the insertion and withdrawal, and the operators are bound continually to the sausage filling and suspension cycles. The object of the invention is thus to disclose a process and a device to be handled by one operator, in which the dead times are considerably decreased and the operator is for the most part independent of the filling and suspending cycle.

This is attained in the process according to the invention in that the rods are first brought out of a storage area individually and are brought one after the other into readiness position, in which the rod which is ready and standing by is engaged and supported from below between the two ends in horizontal position, that this rod then is tightly chucked at one end and is fed in this state by an essentially horizontal movement to the loading station, and that finally the loaded rod is supported from below at both ends at the loading station and is fed by at least one further essentially horizontal transverse movement to a holding station, in which a number of loaded rods are collected for transfer by being shoved onto a smoking or cooking wagon.

A device for execution of the process according to the invention is distinguished in further configurations of the invention by a magazine for storage and supply of a number of unloaded smoking rods or cooking rods in horizontal position, a controllable separating device which allows for the movement of one rod at a time out of the magazine into a readiness position, a movable clamping device, by which the ready rods can be tightly chucked and can be transferred into a loading position, and a transport device, by which the rod loaded with sausages can be picked up by both ends and can be fed to a collecting station.

The invention is to be explained in greater detail hereinafter relative to two exemplary embodiments of devices for execution of the process according to the invention. In the drawings.

Figure 2:
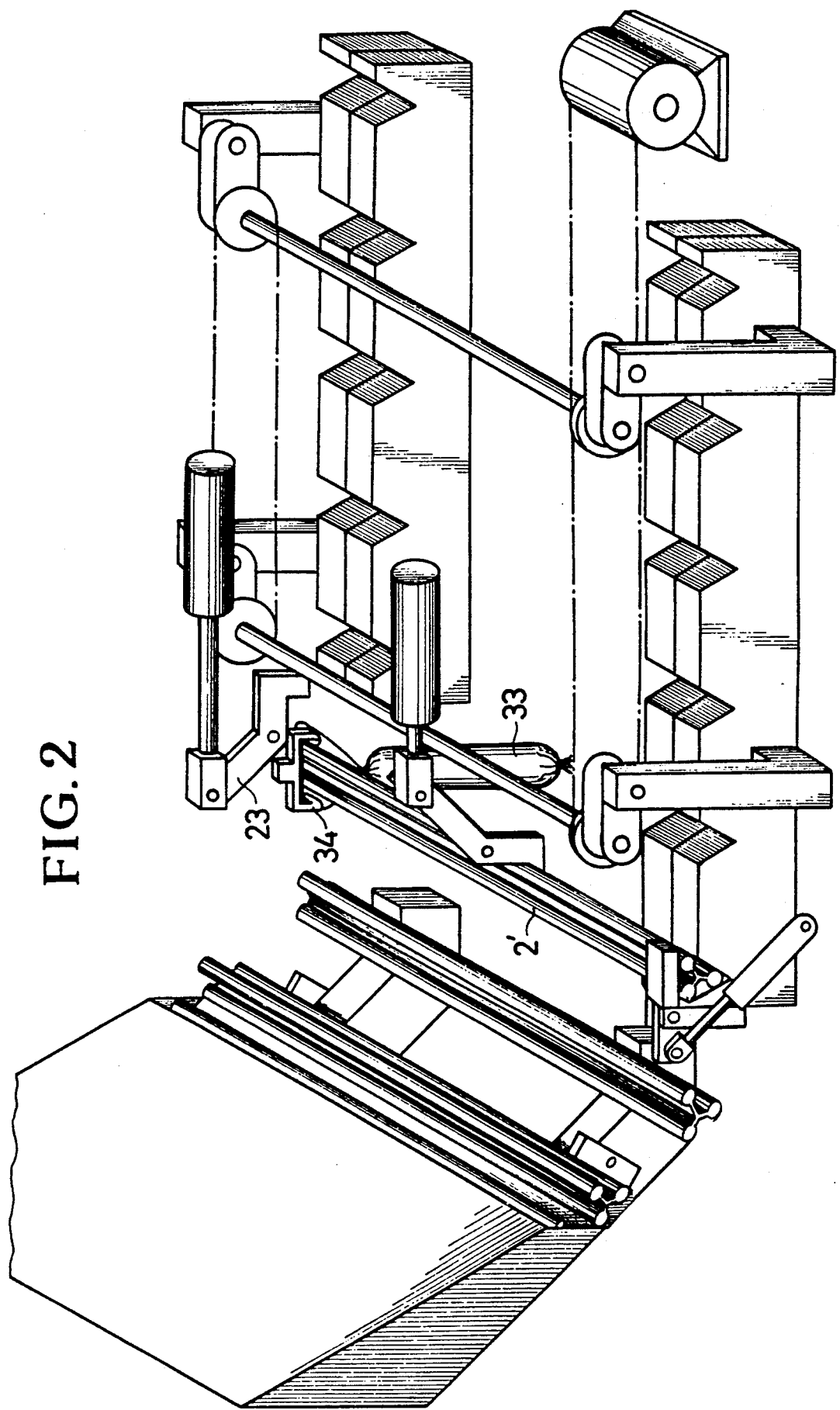
Figure 3:
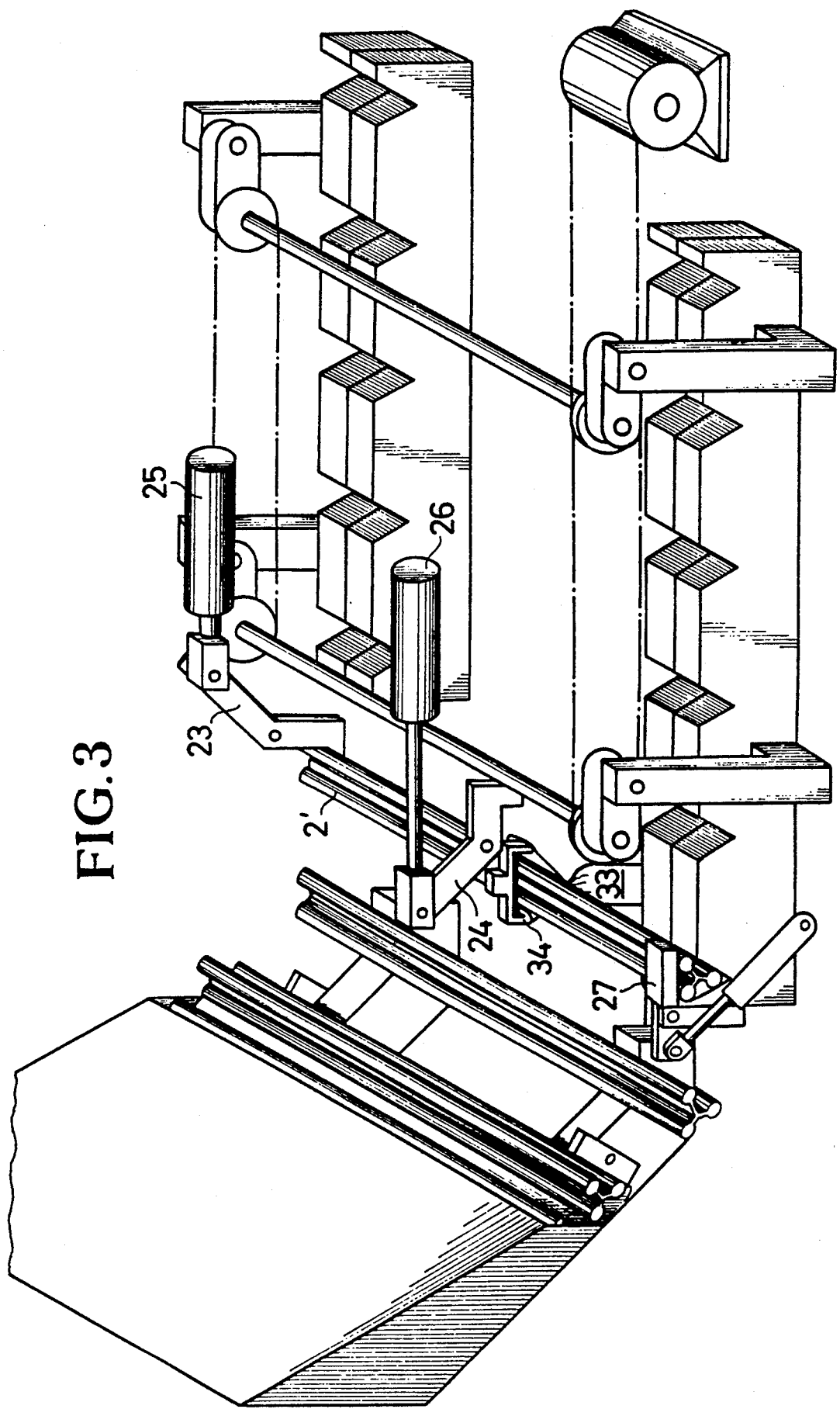
Figure 4:
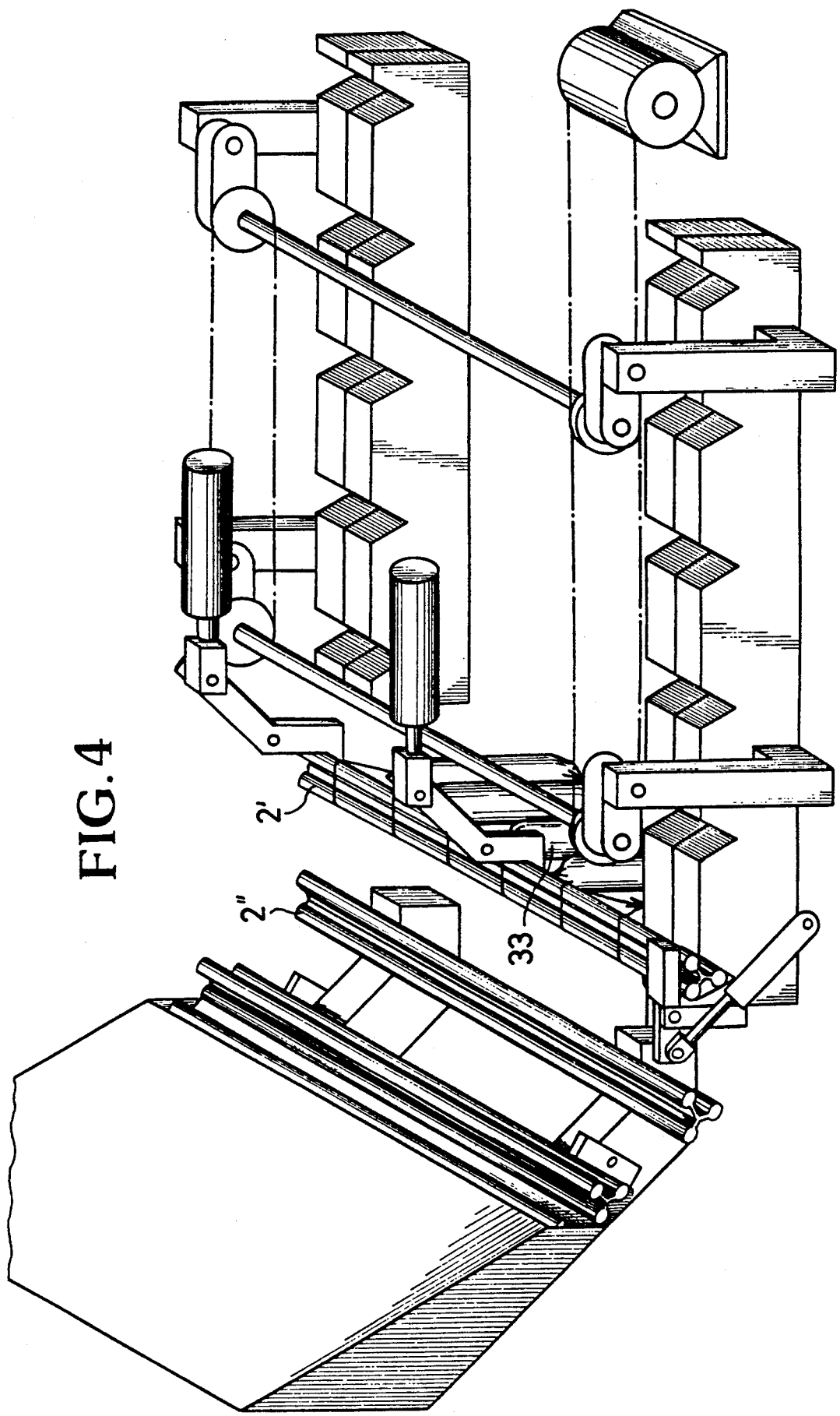
Figure 5:
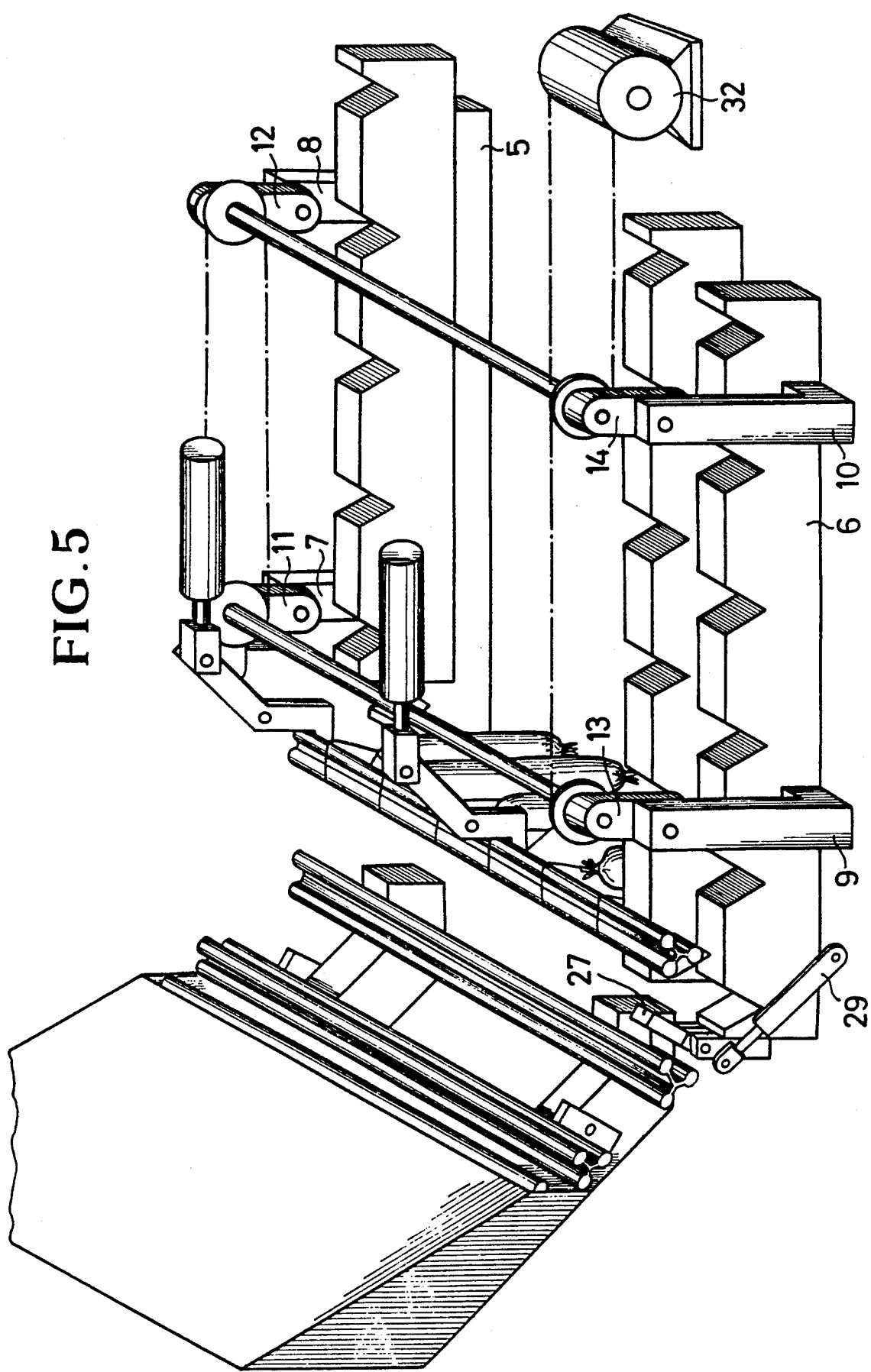
Figure 6:
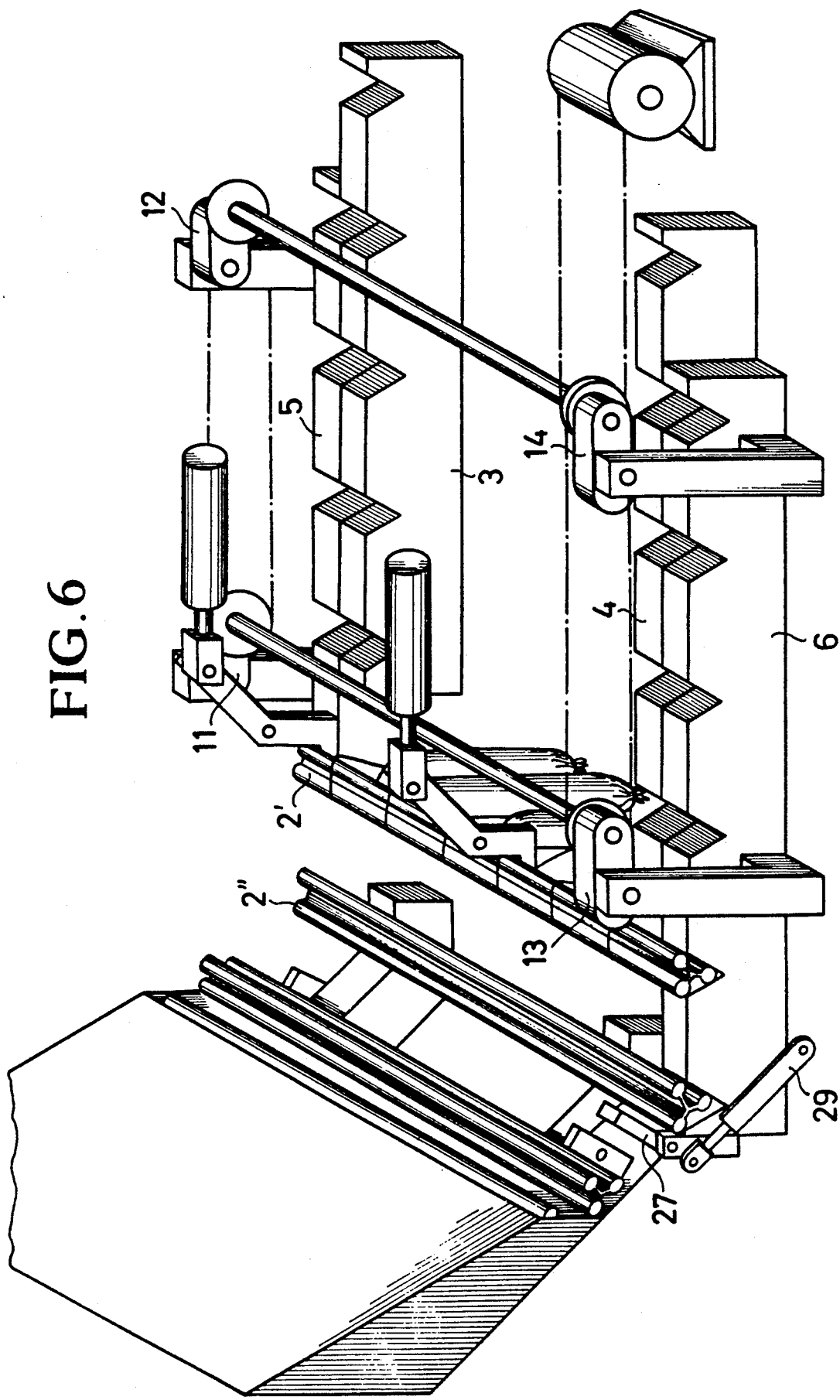
Figure 7:
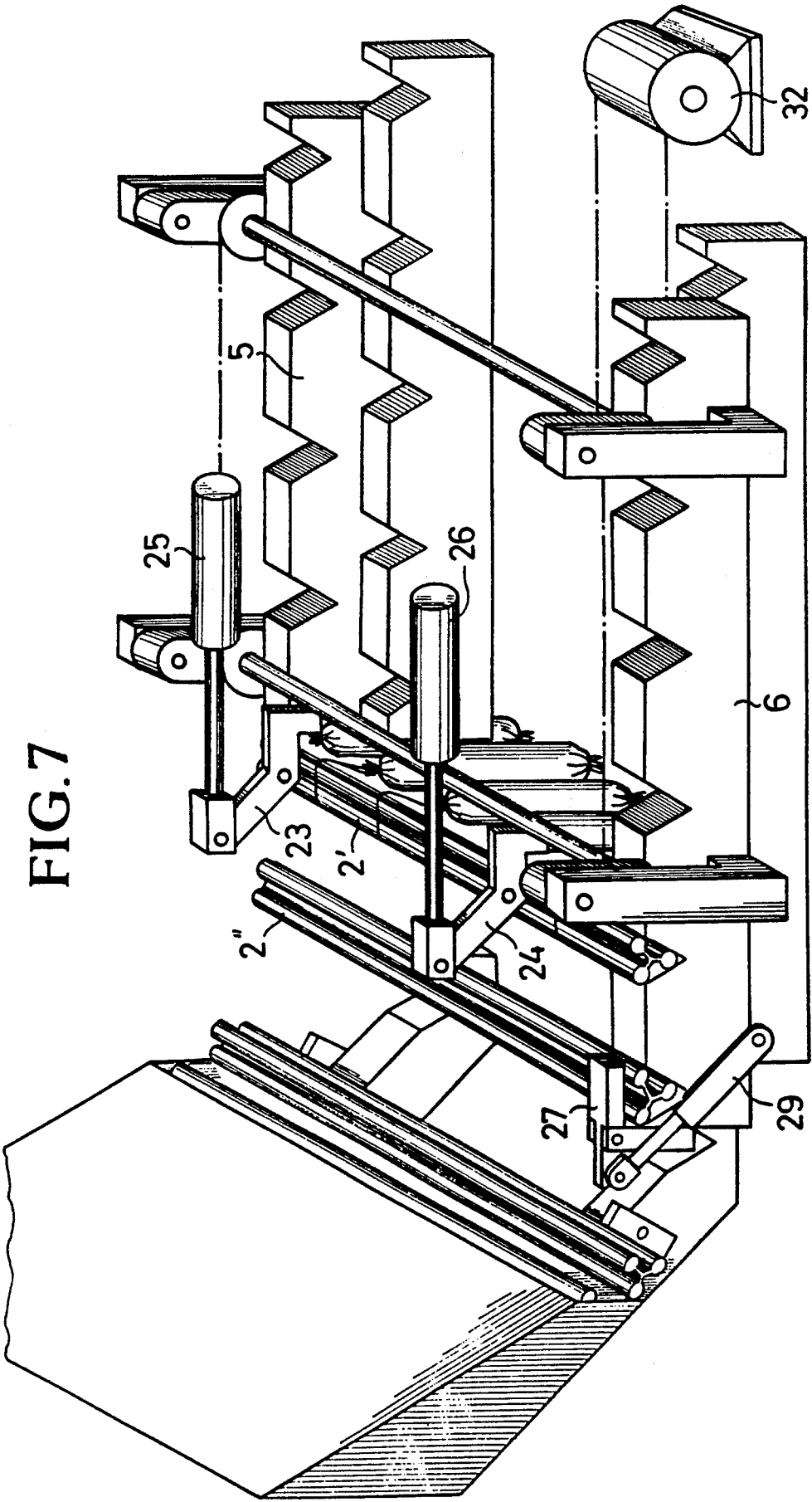
Figure 8:
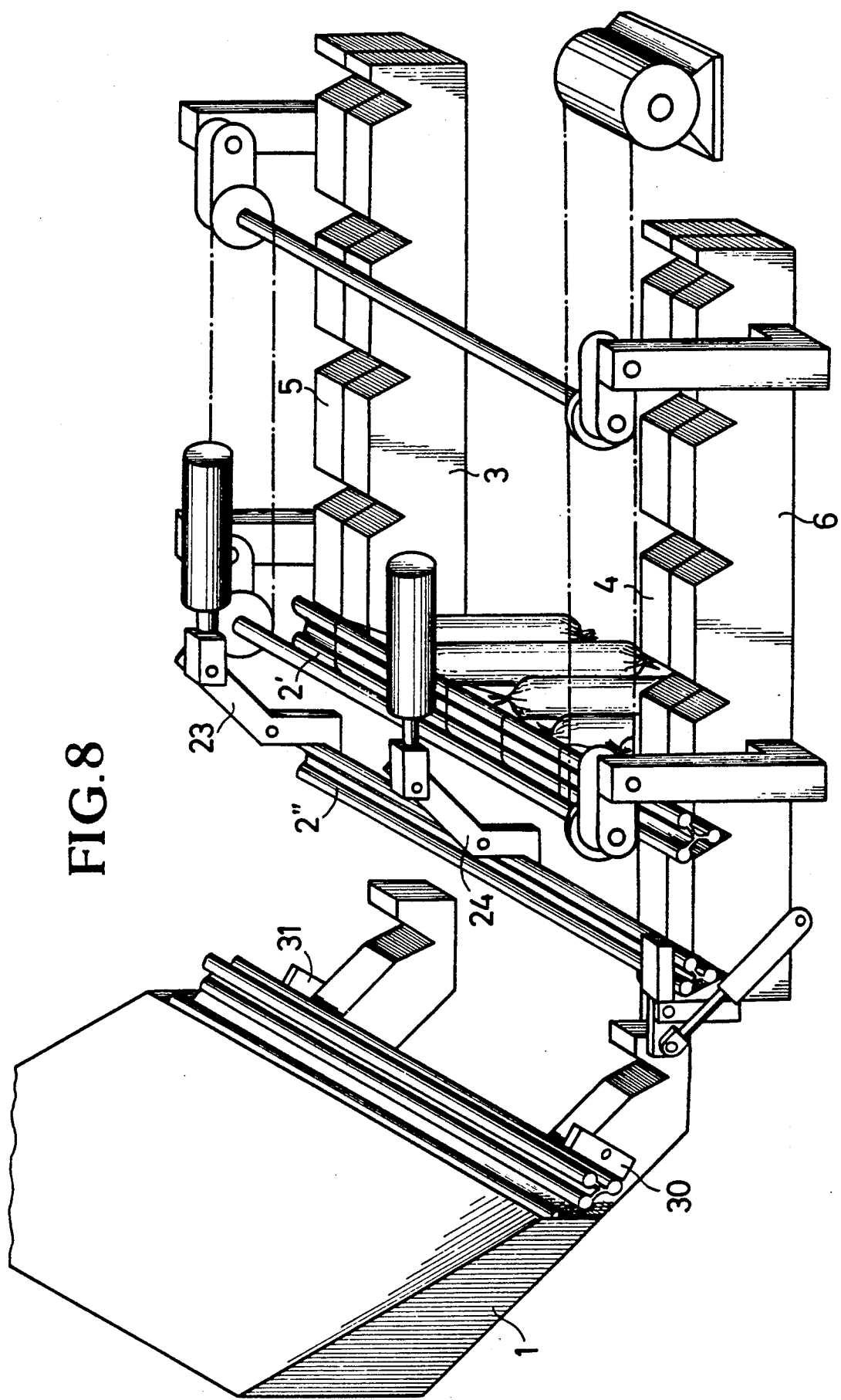
Figure 9:
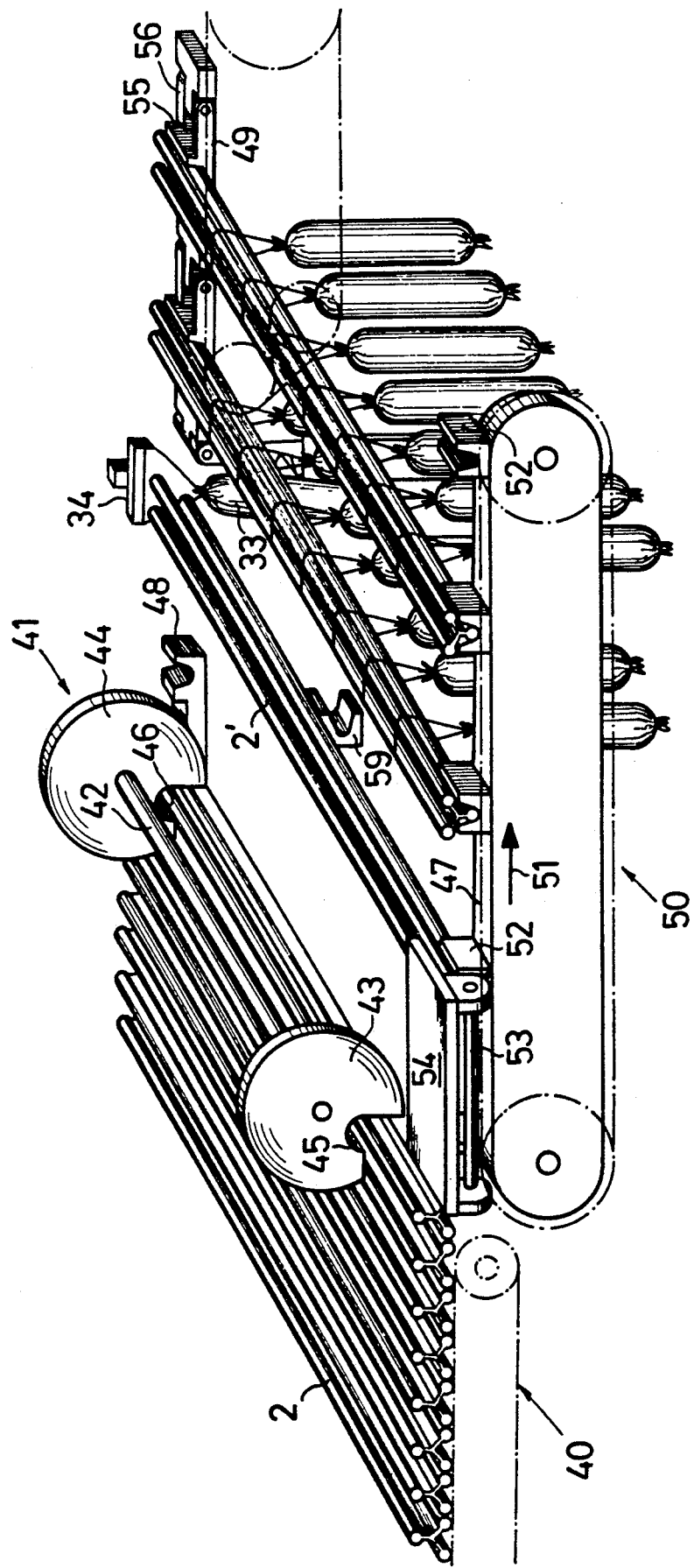
Figure 10:
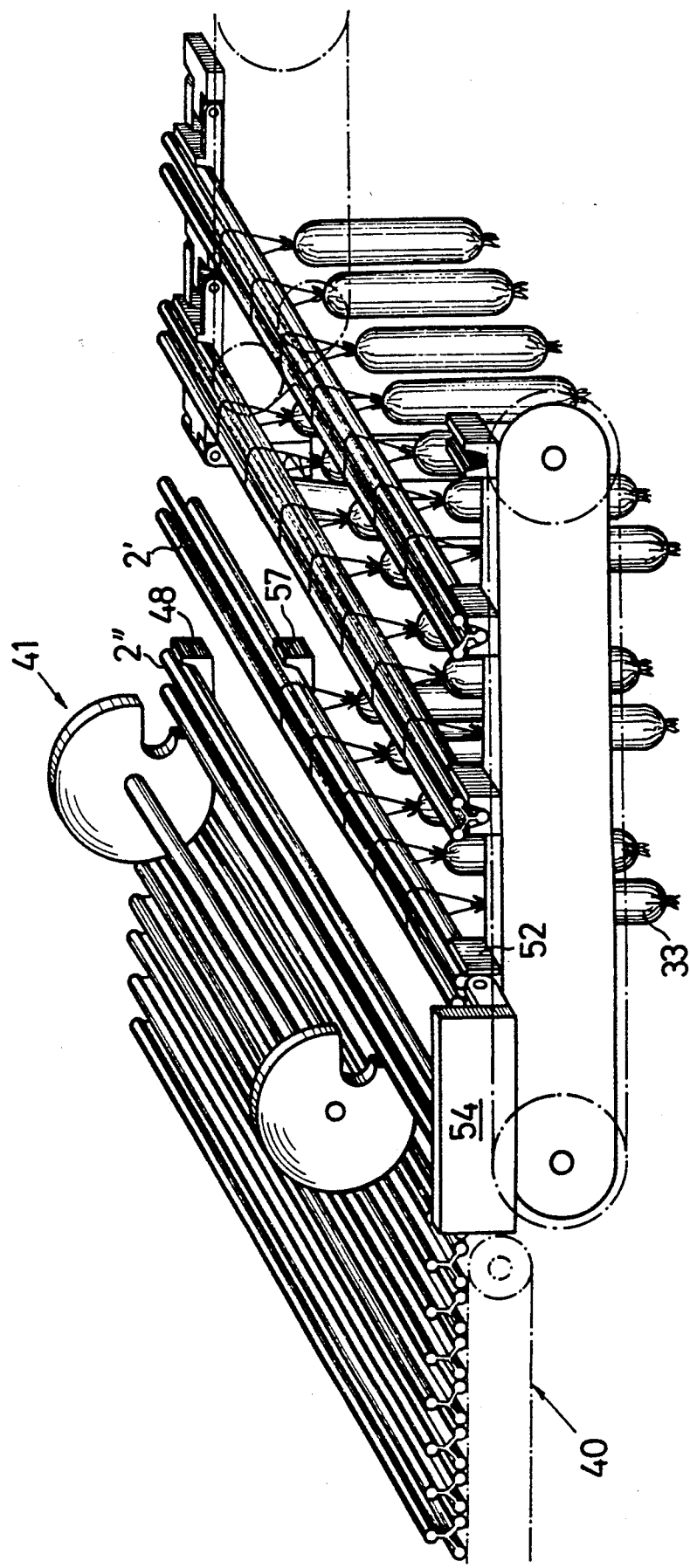
Figure 11:
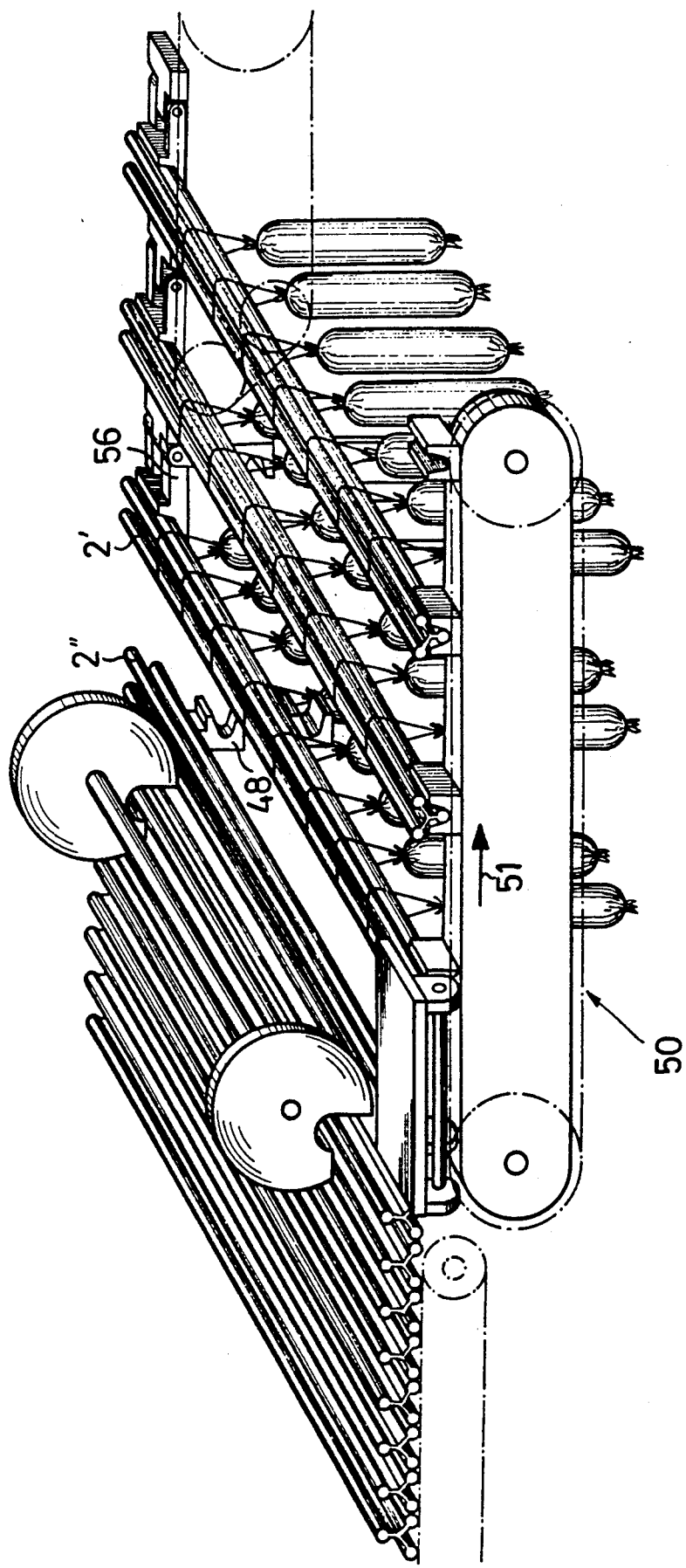

FIG. 1 is a perspective, diagrammatic representation of a first embodiment of a device for the input and carrying away of smoking rods or cooking rods to or from a loading station at the beginning of a work cycle with one rod in loading position and another rod in readiness position, FIG. 2 is the same device during loading of a smoking or cooking rod with one sausage, FIG. 3 is the device with the sausage in further advanced forward position, FIG. 4 is the device following complete loading of the rod with a certain number of sausages, FIG. 5 is the device during the unloading movement of the lifting beam to its receiving position, FIG. 6 is the device with a lifting beam in the receiving position, FIG. 7 is the device with the lifting beam during the transport movement, FIG. 8 is the device with the lifting beam in the depositing position, before another rod is released from the magazine into the readiness position, FIG. 9 is a perspective, diagrammatic representation of another embodiment of the device with a still unloaded rod in loading position, in which a number of already loaded rods is also shown, FIG. 10 is the same device during the loading, in which another rod has been brought into the readiness position, and FIG. 11 is the device with the rod which has been totally loaded in position to be carried away.

The device shown in FIGS. 1 to 8 consists essentially of a magazine 1 for a number of smoking or cooking rods 2, two stationary support beams 3 and 4, which are provided with notches at suitable spacing to receive the rods 2, and two movable lifting beams 5 and 6, which are provided with identical notches at the same spacing. Lifting beam 6 and the associated support beam 4 extend further to the left by one notch division, in other words in the direction of magazine 1, than beams 3 and 5 and in the extended area they have one more notch. Two pairs of bearing elements 7, 8 and 9, 10 are mounted on lifting beams 5 and 6, which are articulated on crank arms 11, 12 and 13, 14, which are fixed in pairs on shafts 15 and 16. Shafts 15, 16 bear chain wheels 17, 18, 19 and 20 at their ends, which are connected with each other in pairs in drive connection by chains shown in dot-dash lines. Furthermore another chain wheel 21 is mounted on shaft 16, which is connected by another dot-dash-indicated chain 22 with a not shown chain wheel on the shaft of a drive motor 32.

Two pivotal supporting levers 23, 24, associated with the device, can be pivoted by pneumatic or hydraulic work cylinders 25 and 26 between a support position in which they support smoking or cooking rod 2 from below in loading position, and a release position. The two positions can be occupied by the two levers simultaneously or alternately.

A clamping device is mounted on lifting beam 6, which consists of a clamping lever 27, a bearing 28 and a pneumatic or hydraulic work cylinder 29, cooperating with the front notch.

Magazine 1 has the structure of an obliquely inclined funnel with a (not shown) input opening and a discharge opening, at which two check levers 30 and 31 are mounted at some spacing, which can be pivoted by (also not shown) drive members similar to work cylinders between a blocking position and a release position.

The device which has been described works as follows: In FIG. 1 the device is in its initial position for the loading of a cooking rod found in loading position. The notches in lifting beams 5, 6 are flush with those in support beams 3 and 4. Crank arms 11, 12, 13 and 14 are set in horizontal setting to the right. In the notch in the front extension of beams 4 and 6 is held a smoking or cooking rod 2 with standard trihedral configuration in the conventional manner, and it is tightly chucked at its one end in the notch of lifting beam 6 by clamping lever 27. Support levers 23 and 24 are both pivoted with the aid of work cylinders 25 and 26 into the support position where they support rod 2 as additional support at two points. In FIG. 2 the loading of the smoking or cooking rod 2 with sausages begins. For this purpose first of all support lever 23 is pivoted into its release position, so that the suspension hook 34 of an also not shown suspension device can bring a first sausage 33 over the free end of the rod 2 onto this rod.

As soon as sausage 33 has passed support lever 23, the support lever is brought back again into support position by work cylinder 25, and support lever 24 is pivoted by work cylinder 26 into the release position (FIG. 3), so that suspension hook 34 with the sausage 33 suspended thereon can pass support lever 24. Finally sausage 33 is released from suspension hook 34 near the gripping point of rod 2 at clamping lever 27.

The process described above is repeated until the smoking rod or cooking rod 2 is draped completely with suspended sausages (FIG. 4). In order to discharge this rod and to bring a new rod 2", which is already to be found in the readiness position, into the loading position, first of all clamping lever 27 is pivoted by the work cylinder 29 into its release position. Then drive motor 32, which can also be a hydraulic motor, is connected for one revolution and pivots crank arms 11, 12, 13, 14 with lifting beams 5, 6 suspended on holding elements 7, 8, 9, 10 first empty into the position shown in FIG. 5. After another quarter revolution of motor 32 crank arms 11, 12, 13, 14 are pointed to the left (FIG. 6), and the notches of lifting arms 5 and 6 again coincide with the notches of support arms 3 and 4. In this position clamping lever 27 is brought again into its clamping position by work cylinder 29 and clamps the smoking rod or cooking rod 2" which is found in readiness position in the first notch of lifting beam 6. Now support levers 23 and 24 are pivoted by work cylinders 25 and 26 together into their release position, and with further revolution of drive motor 32 both the unloaded rod 2" and also the loaded rod 2 are raised by lifting beams 5, 6 (FIG. 7) and finally are placed in the notches of support beams 3, 4 after one more notch graduation (FIG. 8). With the depositing the support levers 23, 24 are also pivoted back again into their support position, and the rod 2" then found in the loading position can be loaded with sausages in the described manner, while the loaded rod 2 is found in a first holding position awaiting transfer to the smoking or cooking wagon. Then only the operation of stop levers 30, 31 is needed in order to bring another smoking or cooking rod out of magazine 1 into readiness position, and the original position is reached again, as in FIG. 1.

After each such cycle the first loaded rod 2 is found placed on support beams 3, 4 another notch to the right, until support beams 3, 4 are completely loaded. After this is completed, then all of the loaded rods are removed by hand or with a suitable device such as a sort of a robot from support beams 3, 4 and suspended in the smoking or cooking wagon. Until that time however the operator of the device has time to perform other work. The longer the support beams 3, 4 and the lifting beams 5, 6, and the more notches thereon, the longer is this time span. The device shown in FIGS. 9 to 11 works in principle exactly as the device described above, only with the difference that the transport movements likewise occuring in stages are exclusively horizontal movements.

Instead of the stationary magazine 1 of the described device, a movable magazine 40 is provided, consisting of two parallel conveyor belts, on which the empty smoking or cooking rods 2 are transported to a separating or releasing device 41. The conveyor belts of magazine 40 could be moved in stages, they could however also circulate continuously and thus with their smooth surfaces they could slide through beneath the rods 2 as they are held back by separating device 41.

Separating device 41 consists of two control disks 43, 44, mounted on a shaft 42, which are provided with cutouts 45 and 46 at the periphery. Cutouts 45, 46 are formed so that during the pivoting of the control disks 90° counterclockwise the magazined rod 2 at the front is picked up and is transferred with one end on a conveyor belt 47 and is secured with the other end in the notch of a holding pawl 48, which is controlled to be able to pivot between a raised receiving position and a folded down releasing position.

Conveyor belt 47 together with conveyor belt 49 parallel thereto forms a transport device 50, which can be moved forward in steps by a (not shown) drive for a certain distance or graduation in the direction of the arrow 51. With this graduated spacing, guide pawls 52 with notches are provided mounted tightly on the periphery of conveyor belt 47, and when transport device 50 is standing still one guide pawl 52 with notches at a time at the beginning of conveyor belt 47 comes into alignment with the holding pawl 48 and the guide pawl 52 which is next in the direction of arrow 51 determines the loading position for a smoking or cooking rod 2, which is clamped tightly in the notch of this guide pawl with the aid of a clamp cover 54 which is pivotally controlled to pivot around a stationary axis 53. Clamp cover 54 is configured to be of such length that is also covers the first guide pawl 52 which is in alignment with holding pawl 48, and can be folded up out of the clamping position shown in FIGS. 9 and 11 into the release position shown in FIG. 10.

Conveyor belt 49 is provided with guide pawls 55 at the same graduated spacing, which are in alignment in pairs with guide pawls 52 of conveyor belt 47. Guide pawls 55 however as opposed to guide pawls 52 are not arranged tightly on conveyor belt 49, but rather are resting on levers 56, which are articulated to pivot on top of conveyor belt 49 or to be directed toward magazine 40. Conveyor belt 49 is also shorter than conveyor belt 47 and ends at such distance from holding pawl 48 that a lever 56 at the beginning of conveyor belt 49 by means cf a (not shown) lifting device can be pivoted between the folded down position shown in FIG. 9 and the folded up position shown in FIG. 11, in which it engages and supports the free end of the smoking rod or cooking rod 2 found in the loading position. Finally, a support pawl 57 is provided for the smoking rod or cooking rod 2 found in loading position, and pawl 57 can be pivoted between a release position (FIG. 9) and a support position (FIG. 10) and in the support position supports the rod 2 approximately in the middle.

The described device works as follows FIG. 9 shows the device in the initial position of a work cycle, in which the smoking or cooking rod 2 clamped tightly by the clamp cover 54 in loading position is still unloaded. Support pawl 57 is in the release position, so that a sausage 33 suspended with its suspension loop on a suspension hook 34 can be guided onto rod 2 and finally can be deposited at the end of the chuck. In this state all of the subsequent smoking rods or cooking rods 2 are still held back from control disks 43, 44 on magazine 40.

When smoking or cooking rod 2 now found in loading position is approximately half full of sausages 33 (FIG. 10), support pawl 57 is brought into support position, and clamp cover 54 is folded up. This is possible because the rod 2 found in loading position is supported by pawl 57 and therefore no clamping on guide pawl 52 is required. With the folding upward of clamp cover 54 however the guide pawl found at the beginning of conveyor belt 47 is also released, so that the separating device 41 can be operated and conveys front rod 2" out of magazine 40 to this guide pawl and holding pawl 48, and clamp cover 54 is brought back again into clamping position. Now the rod 2 found in loading position can be loaded completely with sausages. When this state is reached, the first lever 56 is folded up to conveyor belt 49, as shown in FIG. 11, so that it engages and supports the free end of the rod 2 found in loading position. Then holding pawl 48 is folded down into release position, so that rod 2" in readiness positon is released. Now transport device 50 can be moved forward the distance of one graduation in the direction of arrow 51, so that empty rod 2" can get into loading position and previously loaded rod 2 can be moved into a first holding position on transport device 50.

Two more rods loaded with sausages are shown in FIGS. 9 and 10, which are found already in holding position in these drawings, and only the front holding position is still free. With the forward movement of transport device 50 as aforementioned, these rods are moved forward correspondingly, so that all of the holding positions are filled. In this state the operator must now remove the waiting loaded smoking or cooking rods from transport device 50 and suspend them in smoking or cooking wagons. Then during the following three work periods the worker has time to devote to other tasks.

The number of holding positions of course is not limited to three, but can be increased as desired.

The described devices in turn could be electronically controlled according to a certain program, together with a sausage filling machine along with contracting and sealing tool and a suitable sausage suspension device, the program in the loading position of a smoking or cooking rod determining the time cycle and the number of sausages to be produced on the filling machine and to be transferred to the rod according to the caliber and length or weight burden and correspondingly could also control the work cylinders for operation of the support elements, whereupon the filling machine and the suspension device are stopped for the changing of the rods and the individual movement sequences are controlled for the rod change in the described devices.

We claim:

1. A process for the inputting and carrying away of smoking rods or cooking rods to and from a loading station at which one rod at a time is tightly chucked at one end and is supported alternately at at least two points at some spacing from one another on the rod for the automatic suspension of a number of sausages on loops connected thereto, characterized by the steps of first bringing the rods out of a storage area individually and then bringing each individual rod one after the other into a readiness position, engaging and supporting the rod in the readiness position from below between the two ends of the rod in a horizontal setting, feeding this rod by an essentially horizontal transverse movement in a direction to the loading station, loading the rod with sausages at the loading station, supporting the loaded rod at the loading station at both ends, feeding the loaded rod by at least one more essentially horizontal transverse movement in the same direction to a holding position, and collecting at one or more subsequent holding positions one or more loaded rods to be transferred onto a smoking or cooking wagon.

2. Process as in claim 1, characterized in that the transverse movements of all of the rods occur simultaneously.

3. Process as in claim 1, characterized in that the transverse movements are repeated in a predetermined time cycle.

4. Process as in claim 1, characterized in that the transverse movements are combined with lifting and lowering movements.

5. Process as in claim 3, characterized in that the individual movement sequences are electronically controlled according to a predetermined program, which program, during an input and carrying away operation of a number of rods, stops the operation of preprogrammed devices for the sausage production and suspension.

6. Process as in claim 4, characterized in that the combined movements run in a semicircular path.

7. Process as in claim 1, characterized in that said initial feeding step includes the step of chucking the rod at one end before the rod is moved.

* * * * *